(12) United States Patent
Leroy et al.

(10) Patent No.: US 7,746,248 B2
(45) Date of Patent: Jun. 29, 2010

(54) METHOD AND SYSTEM FOR AUTOMATICALLY EXCHANGING INFORMATION CONCERNING AN AMOUNT OF WATER BY WIRELESS COMMUNICATION BETWEEN A VEHICLE AND AN INFORMATION CENTER

(75) Inventors: Luc Leroy, Toulouse (FR); Paolo Cavarero, Hamburg (DE); Murat Uenlue, Hamburg (DE); Marko Alke, Hamburg (DE)

(73) Assignees: Airbus Deutschland GmbH (DE); Airbus SAS (FR)

( * ) Notice: Subject to any disclaimer, the term of this patent is extended or adjusted under 35 U.S.C. 154(b) by 322 days.

(21) Appl. No.: 11/893,599

(22) Filed: Aug. 14, 2007

(65) Prior Publication Data

US 2009/0045980 A1    Feb. 19, 2009

(51) Int. Cl.
*G08B 21/00* (2006.01)
(52) U.S. Cl. ...................................................... 340/945
(58) Field of Classification Search ................. 340/945, 340/426.15, 426.16, 502, 505, 539.1, 573.6
See application file for complete search history.

(56) References Cited

U.S. PATENT DOCUMENTS

| 7,265,668 | B1* | 9/2007 | Brosius | 340/539.22 |
| 2003/0158640 | A1* | 8/2003 | Pillar et al. | 701/33 |
| 2006/0109103 | A1* | 5/2006 | Bradus | 340/531 |

* cited by examiner

*Primary Examiner*—Phung Nguyen
(74) *Attorney, Agent, or Firm*—Lerner, David, Littenberg, Krumholz & Mentlik, LLP

(57) ABSTRACT

A method and a system for automatically exchanging information by wireless communication, particularly between a vehicle such as an aircraft and an information center, is proposed. The information to be exchanged concerns an amount of water for the vehicle. The amount of water on board of the vehicle is automatically measured by a device for determining the amount of water. The transmitter of a device for exchanging information at the vehicle automatically and wirelessly transmits the information concerning the current amount of water to a receiver of a device for exchanging information at an information center. New information parameters are wirelessly transmitted from the transmitter of the device for exchanging information at the information center to the receiver of the device for exchanging information at the vehicle.

18 Claims, 2 Drawing Sheets

METHOD AND SYSTEM FOR AUTOMATICALLY EXCHANGING INFORMATION CONCERNING AN AMOUNT OF WATER BY WIRELESS COMMUNICATION BETWEEN A VEHICLE AND AN INFORMATION CENTER

BACKGROUND OF THE INVENTION

The present invention relates to a method for exchanging information, and particularly for exchanging information between a vehicle such as an aircraft and an information center, the information concerning an amount of water carried in the vehicle. Furthermore, the present invention relates to a system adapted to perform such method, a vehicle comprising such system, a computer program adapted to perform such method when executed on a computer and a computer readable medium comprising such program.

For vehicles involved in any kind of passenger transportation it may be important to be able to exchange information concerning the amount of a water for the passengers with an information center. For example, in air traffic it may be advantageous to exchange information about the amount of potable water on board of an airborne aircraft during flight.

During ground service of the aircraft a ground crew inter alia has to refill the water tanks. To calculate the necessary amount of water needed in the following flight the ground crew must have access to several data, i.e. e.g. pax load of the next flight. Usually part of these data is only available at a ground station and/or on the aircraft at the flight attendant panel and it is difficult for the ground crew to access it directly after the landing of the aircraft. Also the on board crew should not be bothered with additional tasks concerning the ground service.

Accordingly, there may be a need for an improved method for exchanging information concerning the amount of water for a vehicle with an information center. Furthermore, there may be a need for a system adapted to perform such a method, a vehicle comprising such a system, a computer program adapted to perform such a method when executed on a computer and a computer readable medium comprising such a program.

SUMMARY OF THE INVENTION

These needs may be met by the subject-matter according to the independent claims. Advantageous embodiments of the present invention are described in the dependent claims.

According to a first aspect of the present invention, a method for exchanging information between a vehicle and an information center, the information concerning an amount of water for the vehicle, is proposed. The method comprising at least the following steps preferably in the following order: determining the amount of the water; and automatically exchanging information about the determined amount of the water via wireless communication.

In other words, the first aspect of the present invention may be seen as based on the idea to e.g. measure or/and calculate the quantity of water for a vehicle and to remotely send data concerning this water preferably without human interaction over distances via wireless communication. Accordingly, as there is no need for direct contact of service personnel like the ground operator, the cabin crew or the cockpit crew with service panels of the vehicle, this can save time during service. Also the crew of the vehicle needn't be bothered with the data transfer, which leaves more time for the original tasks of the crew. For example, in air traffic the airborne aircraft can exchange information with a ground station concerning the amount of water to be filled on board the aircraft for the next flight depending on the number of passengers on that flight. This exchange can take place without the help or interference of the board crew. After landing the aircraft can immediately be optimally serviced with regard to the necessary amount of water, which is possible due to the remotely sent data considering information like pax load and the duration of the next flight.

In the following, possible features and advantages of the method according to the first aspect will be explained in detail.

In the above described first aspect of the present invention, "information" may be a set of digital and/or analog data, which was processed, manipulated or grouped, or a number. The information concerns an amount of water for the vehicle such as e.g. an amount of water carried on board of the vehicle or an amount of water which is to be filled into the vehicle's tanks.

"Water" can denote potable water for the service of passengers or any kind of fresh water for example for cleaning purposes. The amount of water can for example be determined by measuring the volume of the water or by observing other features of the water, which are correlated to the quantity of water.

"Automatically exchanging" may be interpreted such that the vehicle is able to send and receive information without the necessity of human interaction on board such as e.g. instruction by the crew. The vehicle or a device at the vehicle may transmit or receive data as soon as such an exchange is necessary.

The exchange of information is accomplished via "wireless communication", which may be interpreted as a transfer of information from one location to another without the use of cables or electrical conductors. Possible ways of wireless communication are for example transmissions using electromagnetic waves such as High Frequency (HF, 3 MHz to 30 MHz) and Very High Frequency (VHF, 30 MHz to 300 MHz) or transmissions via communication satelites.

The exchange of information may be possible in several directions, i.e. from the vehicle to the information center and/or form the information center to the vehicle. Here the vehicle may be interpreted as a means of transportation like a car, a motorcycle, a train, a ship or in particular an aircraft. The information center may be any base station comprising the counterpart of the communication system at the vehicle according to the present invention. In particular the information center may be a portable device like a computer, the tower of an airport or a ground operator in an airport in general.

According to an exemplary embodiment of the present invention, the automatic exchange of information in the method described above, comprises at least the following steps preferably in the following order: requesting a status report by the information center from the vehicle, the status report indicating current parameters concerning the determined amount of water; sending the status report from the vehicle to the information center; and submitting information indicating new parameters concerning an amount of water from the information center to the vehicle.

After requesting a status report and receiving it remotely e.g. for control purposes, new parameters can be calculated with the help of information available only at the information center and sent back to the vehicle. The new parameters may be needed later during service of the vehicle. For example in air traffic the current water quantity may be sent from the aircraft to the ground terminal. In the ground terminal the necessary additional amount of e.g. potable water for the next flight may be calculated taking into account information like the pax load of the next flight. For example the status report states 40% of the tank volume of potable water on board at landing. The ground terminal calculates the necessary amount of water for the following flight, with a pax load of 70%, to be 80% of the tank volume and submits this value to the aircraft.

The procedures of requesting, submitting, acknowledging, activating and the like may be interpreted as sending or receiving, i.e. exchanging appropriate information, parameter or instruction.

The sending of a "status report" may be interpreted as sending a set of data or information. Particularly it may be the "current parameters" of the determined amount of potable or fresh water carried in the vehicle. "Current parameters" may be the newly measured or latest data concerning the amount of water on the vehicle. "New parameters" may correspond to information submitted to the vehicle from the information center, wherein the new parameters may differ from the current parameters.

According to a further exemplary embodiment of the present invention the new parameters are determined based on the status report and/or the information only available at the information center. That way the current parameters transmitted in the status report may be used for calculating the new parameters. Accordingly weight savings can be achieved as described above.

According to a further exemplary embodiment of the present invention, the automatic exchange of information further comprises the step of acknowledging the received information by sending a validation signal from the vehicle to the information center.

The validation signal may be the data transmitted in the status report or a certain value, number or message previously agreed on by the vehicle and the information center. The validation signal confirms the receipt of the new parameters, so a possible error or malfunction of the method and/or system can be excluded. In the case where the vehicle may not receive new parameters, it does not send a validation signal and so the information center is notified about a possible error and can take the necessary steps to mend the malfunction, for example in repeating the procedure.

According to a further exemplary embodiment of the present invention, the automatic exchange of information further comprises the step of activating the received information by a separate command submitted by the information center to the vehicle.

The separate command may be transmitted as a message, a certain value or number previously agreed on. The separation of the submitted new parameters and the activation of these parameters into two individual communications supports the recognition of possible errors or malfunctions. It may be particularly advantageous to send the activation command from the information center to the vehicle after receiving the validation signal from the vehicle at the information center. This way, the information center first receives a confirmation, that the right data has been received before actually activating it.

According to a further exemplary embodiment of the present invention, the automatic exchange of information further comprises the step of sending a final confirmation from the vehicle to the information center.

The sending of a final confirmation from the vehicle to the information center further supports the recognition of possible errors or malfunctions. By sending a final confirmation the vehicle transmits the verification that the method was accomplished successfully. Otherwise, if no final confirmation is received at the information center it may be a hint that a possible error or malfunction has to be found and fixed.

The value sent from the information center to the vehicle can be corrected and/or set to a new value via a panel on board of the vehicle. This allows for corrections in the case of a malfunction which for example can not be fixed during the flight.

According to a further exemplary embodiment of the present invention, the method further comprises providing of the exchanged information to a data output device located at the vehicle.

The data output device may be a display, a screen or a data interface in or on the vehicle. The data output device may allow for a checking of the automatically transmitted information by the on board crew of the vehicle, if needed. Also it may facilitate the access to the necessary information during service by the ground crew.

After the vehicle passes through the service procedure the value concerning the amount of water can be automatically set to a default value. This helps to prevent errors like the use of not current data for the next service procedure.

According to a further exemplary embodiment of the present invention, the information is exchanged using at least one of HF signal transmission, VHF signal transmission and satellite signal communication.

The transmission using electromagnetic waves such as High Frequency (HF, 3 MHz to 30 MHz) and Very High Frequency (VHF, 30 MHz to 300 MHz) or transmissions via communication satelites is advantageous because direct, long-distance (also inter-continental) transmission may be possible. Particularly communication via satelites is stable and therefore especially convenient for transmitting information over long distances. Furthermore all the mentioned communication types are well established in and suited for air traffic communications.

According to a second aspect of the present invention, a system for exchanging information between a vehicle and an information center, the information concerning an amount of water for the vehicle, is proposed. The system comprises at least the following components: a device for determining the amount of water and a device for automatically exchanging information about the determined amount of water via wireless communication.

The device for determining the amount of water may be a device adapted to measure the volume of water or to observe other features of the water, which are correlated to its quantity, like mass, density or pressure and the like. For example, if the volume of potable water in a sanitary tank shall be measured, then the level of the water may be measured with a spacer or the like and the volume calculated by taking into consideration the dimensions of the tank. Alternatively the amount of the water may be measured by observing the amount of the consumed water with the help of sensors detecting the flow of the water and calculating the current amount using the initial amount of the water in the vehicle and the amount of consumed water. Further examples for measuring devices may be scales, vacuum gauges, manometers and the like in combination with a calculating device like a computer.

The device for automatically exchanging information via wireless communication may comprise a receiving part and a sending part and may be adapted to receive and transmit information via wireless communication. The receiving part may be a radiation detector like for example an antenna, which is adapted for receiving signals or information sent by a sending device, the location of the receiving part differing from the location of a sender. The sending part may be a source of electromagnetic radiation, which transmits information to a receiver. The receiving part and the sending part of the device for automatically exchanging information may be one and the same device or two different devices spatially separated or grouped together.

According to a third aspect of the present invention, an aircraft comprising a system according to the second aspect of the present invention and/or its embodiments, is presented.

According to a forth aspect of the present invention, a program element is presented. The program element when being executed on a processor, is adapted to carry out the method according to the first aspect of the present invention and/or its embodiments.

According to a fifth aspect of the present invention, a computer readable medium is presented. The computer readable medium has stored thereon the program element according to the forth aspect of the present invention.

It has to be noted that embodiments of the invention are described with reference to different subject matters. In particular, some embodiments are described with reference to method type claims whereas other embodiments are described with reference to apparatus type claims. However, a person skilled in the art will gather from the above and the following description that, unless other notified, in addition to any combination of features belonging to one type of subject matter also any combination between features relating to different subject matters is considered to be disclosed with this application.

The aspects defined above and further aspects, features and advantages of the present invention can also be derived from the examples of embodiments to be described hereinafter and are explained with reference to examples of embodiments. The invention will be described in more detail hereinafter with reference to examples of embodiments but to which the invention is not limited.

DETAILED DESCRIPTION

Figure 1:
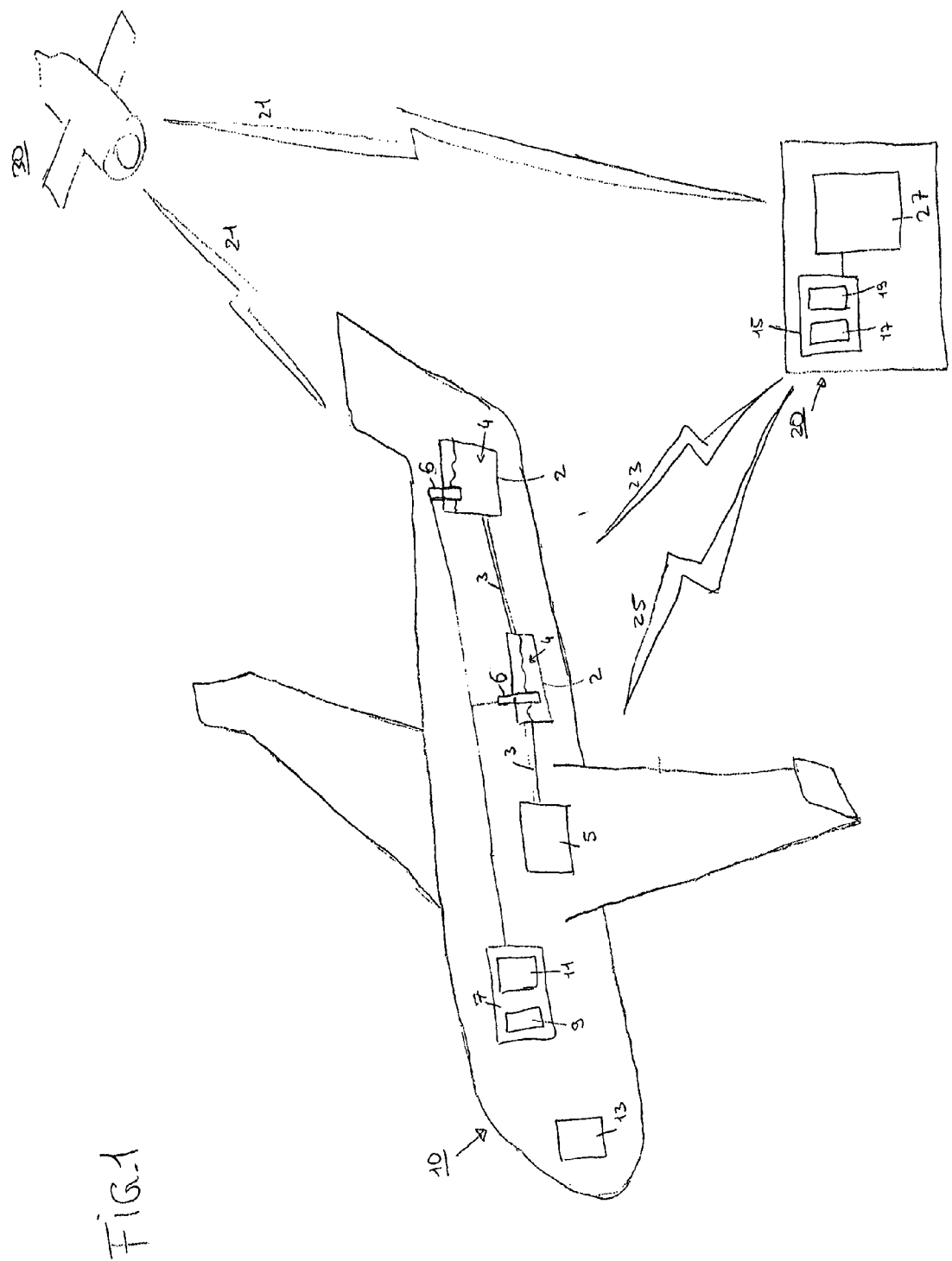
FIG. 1 shows a schematic representation of a system for automatically exchanging information by wireless communication according to an embodiment of the present invention.

The illustration in the drawings is schematically only. It is noted that in different figures, similar or identical elements are provided with the same reference signs.

In FIG. 1 a system for automatically exchanging information by wireless communication according to an embodiment of the present invention is shown schematically. Water tanks (2) are comprised in an aircraft (10), they are interconnected with the water supply system (5) of the aircraft (10) and contain fresh water (4) or potable water (4) for the passengers. In the case of potable water tanks (2) the tanks and also the pipes (3) for interconnecting are sanitary. The amount of water (4) in a tank (2) is automatically measured by a device (6) for determining the amount of water. The information concerning the current amount of water (4) is collected in the device (7) for exchanging information. The device (7) for exchanging information comprises a receiver (9) and a transmitter (11). The transmitter (11) automatically and wirelessly transmits the information concerning the current amount of water (4) to a receiver (17) of a device (15) for exchanging information at an information center (20). The information concerning the current amount of water (4) is processed at the information center (20) in a processor (27) and new information parameters are wirelessly transmitted from the transmitter (19) of the device (15) for exchanging information at the information center (20) to the receiver (9) of the device (7) for exchanging information at the aircraft (10). The wireless communication of information takes place via high frequency HF (23), very high frequency (25) or satellite (30) communication (21). The information can be accessed at the aircraft (10) with the help of a data output device (13).

Figure 2:
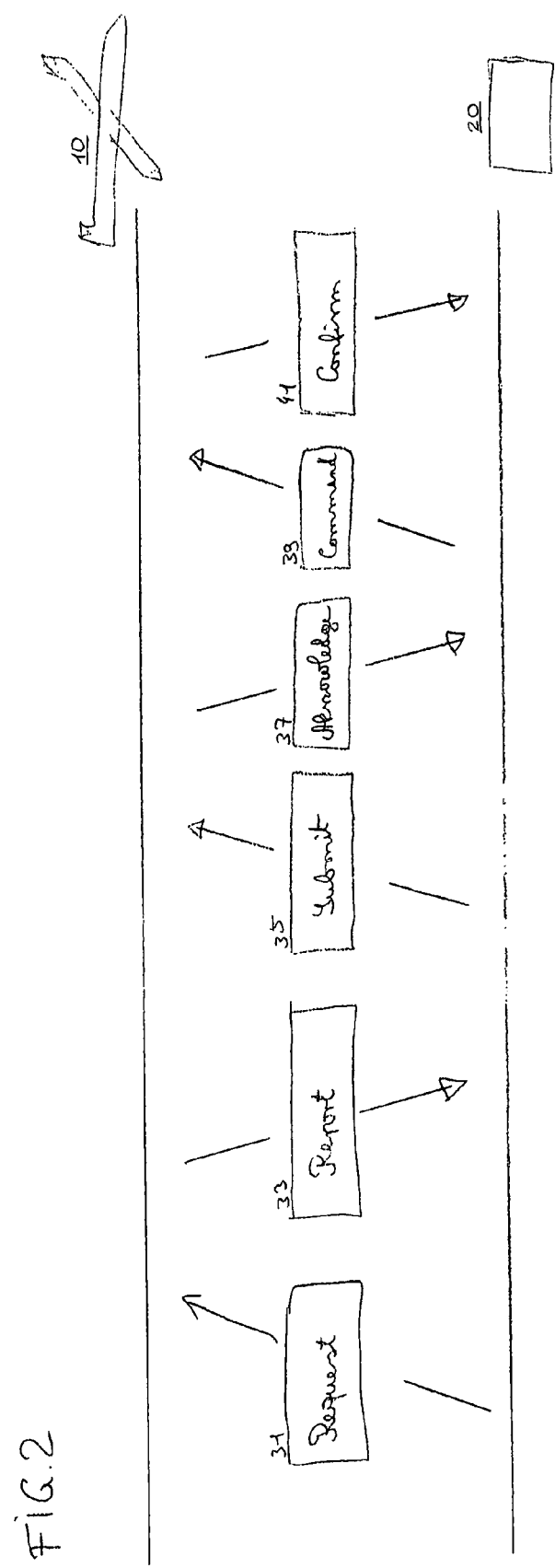
FIG. 2 shows a flow diagram schematically representing a method for automatically exchanging information by wireless communication according to an embodiment of the present invention.

FIG. 2 can be used to explain the basic steps of a method for automatically exchanging information by wireless communication according to an embodiment of the present invention.

The information center (20) sends a request requesting a status report from the aircraft (10). The status report indicating current parameters concerning the determined amount of water (4) (step 31).

The aircraft (10) sends the current parameters concerning the determined amount of water (4) to the information center (10) (step 33).

Than the information center (20) submits information indicating new parameters concerning an amount of water (4) to be refilled during the next service on the aircraft (10) (step 35).

The aircraft (10) acknowledges the received information by sending back a validation value to the information center (20) (step 37).

The information center (20) activates the received information in the aircraft (10) by sending a separate command to the aircraft (10) (step 39).

The aircraft (10) sends a final confirmation to the information center (20) (step 41).

It should be noted that the term "comprising" does not exclude other elements or steps and the "a" or "an" does not exclude a plurality. Also elements described in association with different embodiments may be combined. It should also be noted that reference signs in the claims should not be construed as limiting the scope of the claims.

LIST OF REFERENCE SIGNS 2 water tank
3 pipe
4 water
5 water supply system
6 device for determining the amount of water
7 device for exchanging information
9 receiver
10 aircraft
11 transmitter
13 data output device
15 device for exchanging information
17 receiver
19 transmitter
20 information center
21 information exchange via satellite
23 information exchange via HF
25 information exchange via VHF
27 processor
30 satellite

The invention claimed is:

1. A method for exchanging information between a vehicle and an information center, the information concerning an amount of water for the vehicle, the method comprising:
   determining the amount of water; and automatically exchanging information about the determined amount of water via wireless communication;

wherein the automatic exchange of information comprises submitting information indicating new parameters concerning an amount of water from the information center to the vehicle.

2. The method of claim 1, wherein the automatic exchange of information further comprises:

requesting a status report by the information center from the vehicle, the status report indicating current parameters concerning the determined amount of water;

sending the status report by the vehicle to the information center.

3. The method of claim 2, wherein the new parameters are determined based on the information only available at the information center.

4. The method of claim 1, wherein the automatic exchange of information further comprises:

acknowledging received information by sending a validation signal from the vehicle to the information center.

5. The method of claim 1, wherein the automatic exchange of information further comprises:

activating of received information by a separate command submitted by the information center to the vehicle.

6. The method of claim 1, wherein the automatic exchange of information further comprises:

sending a final confirmation from the vehicle to the information center.

7. The method of claim 1, further comprising providing the exchanged information to a data output device located at the vehicle.

8. The method of claim 1, wherein the information is exchanged using at least one of HF signal transmission, VHF signal transmission and satellite signal communication.

9. A system for exchanging information between a vehicle and an information center, the information concerning an amount of water for the vehicle, the system comprising:

a device for determining the amount of water;

a device for automatically exchanging information about the determined amount of water via wireless communication; and a receiver adapted for receiving submitted information from the information center, wherein the information is indicating new parameters concerning an amount of water.

10. The system of claim 9, wherein the device for automatically exchanging information further comprises:

a transmitter adapted for sending the status report to the information center;

wherein the receiver is further adapted for receiving a request for a status report from the information center, the status report indicating current parameters concerning the determined amount of water.

11. The system of claim 9, wherein the device for automatically exchanging information comprises a transmitter adapted for acknowledging the received information by sending back a valid value to the information center.

12. The system of claim 9, wherein the device for automatically exchanging information comprises a receiver is adapted for activating received information by receiving a separate command submitted by the information center.

13. The system of claim 9, wherein the device for automatically exchanging information comprises a transmitter adapted for sending a final confirmation to the information center.

14. The system of claim 9, further comprising a data output device located at the vehicle.

15. An aircraft comprising a system for exchanging information between a vehicle and an information center, the information concerning an amount of water for the vehicle, the system comprising:

a device for determining the amount of water;

a device for automatically exchanging information about the determined amount of water via wireless communication; and a receiver adapted for receiving submitted information from the information center, wherein the information is indicating new parameters concerning an amount of water.

16. A system for exchanging information concerning an amount of water for a vehicle between the vehicle and an information center, comprising a processor programmed with a set of instructions for:

determining the amount of water; and automatically exchanging information about the determined amount of water via wireless communication;

wherein the automatic exchange of information comprises submitting information indicating new parameters concerning an amount of water from the information center to the vehicle.

17. In a system for exchanging information between a vehicle and an information center, concerning an amount of water for the vehicle, a computer readable medium storing instructions for causing a processor to:

determine the amount of water; and automatically exchange information about the determined amount of water via wireless communication;

wherein the automatic exchange of information comprises submitting information indicating new parameters concerning an amount of water from the information center to the vehicle.

18. An aircraft comprising a system for exchanging information between a vehicle and an information center, the information concerning an amount of water for the vehicle, the system comprising:

means for determining the amount of water;

means for automatically exchanging information about the determined amount of water via wireless communication; and a receiver adapted for receiving submitted information from the information center, wherein the information is indicating new parameters concerning an amount of water.

* * * * *